A. C. BRIGNONI.
LOCOMOTIVE PISTON PACKING.
APPLICATION FILED SEPT. 10, 1915.
1,196,652.
Patented Aug. 29, 1916.
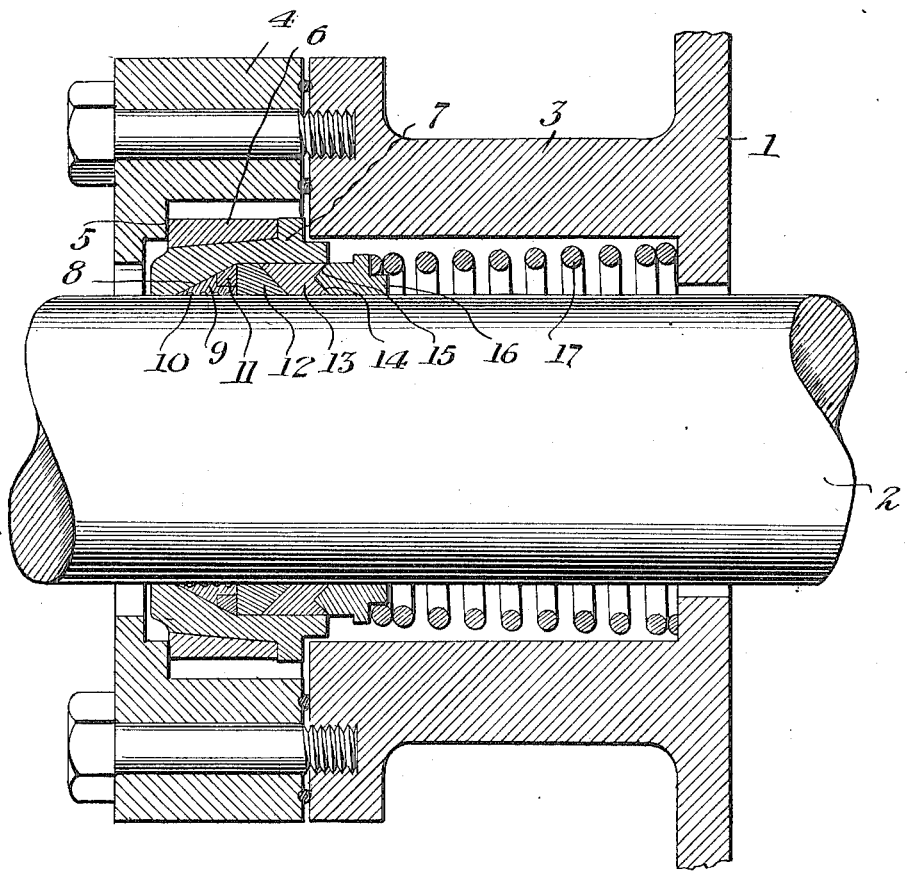
Witnesses
Inventor
A. C. Brignoni
By Victor J. Evans
Attorney

UNITED STATES PATENT OFFICE.

ALBERT C. BRIGNONI, OF COVINGTON, KENTUCKY, ASSIGNOR OF ONE-THIRD TO FRANK L. SMITH, OF COVINGTON, KENTUCKY; AND ONE-THIRD TO JAMES T. HOWLEY, OF NEWPORT, KENTUCKY.

LOCOMOTIVE-PISTON PACKING.

1,196,652.   Specification of Letters Patent.   Patented Aug. 29, 1916.

Application filed September 10, 1915. Serial No. 50,044.

*To all whom it may concern:*

Be it known that I, ALBERT C. BRIGNONI, a citizen of the United States, residing at Covington, in the county of Kenton and State of Kentucky, have invented new and useful Improvements in Locomotive-Piston Packings, of which the following is a specification.

This invention relates to piston rod packing and more particularly to a packing rod for use in connection with the piston rods of superheated steam locomotives and the present invention is designed to improve upon the type of packing now in universal use and known as the United States packing.

Further objects of this invention will appear as the following specific description is read in connection with the accompanying drawing which forms a part of this application, and in which the figure is a sectional view showing the packing applied to an ordinary piston rod.

Referring more particularly to the drawing, 1 represents a cylinder head through which the piston rod 2 freely operates without engaging the same. Formed integral with the cylinder head is the usual inner casing 3 which has the gland or outer casing 4 bolted thereto. This gland or outer casing has an internal shoulder 5 abutting against a sleeve 6 secured around the usual flanged vibrator cup 7 whose bore terminates in an inclined shoulder as shown at 8. Surrounding the piston rod and having a conical outer face to abut against the shoulder 8 is a brass packing ring 9 having circumferential grooves 10 on its inner piston engaging face arranged to hold lubricant and to reduce the friction. The ring 9 is split and in this instance, is provided with an annular groove formed in its inner and upper edge which receives a packing ring 11 of babbitt or other suitable antifriction metal which is also inclined upon its outer face to fit the shoulder 8. This ring 11 breaks joint with the ring 9 and has abutting against it a second packing ring 12 positioned to break joint with the rings 9 and 11 and seated between the piston and the inner wall of the vibrating cup 7. The inner face of the ring 12 is inclined so as to properly engage the corresponding face of the packing ring 13. This latter ring is also seated between the piston and the face of the vibrating cup 7 and is positioned to break joint with the ring 12. The inner face of the ring 13 as shown, is provided with a V-shaped annular groove 14 which is engaged by a correspondingly shaped projection 15 formed on the follower 16 which surrounds the piston rod and is arranged between the ring 13 and the coiled compression spring 17, the latter being interposed between the cylinder head and the follower, as shown. It will be readily seen in this instance, that there will be no relative lateral displacement of the follower and ring 13 and that unlike the United States packing, this packing employs two beveled surfaces which firmly hold the packing rings 12, 11 and 9 against the piston rod and that the ring 9 is provided with lubricant receiving grooves which reduce friction and assist the usual swab cup in maintaining proper lubrication.

What is claimed is:—

1. The combination with a vibrating cup having an inclined shoulder, of a split packing ring having a beveled face seated against said inclined shoulder, coöperating therewith, and provided with internal annular lubricant receiving grooves and an external ring receiving groove, a soft metal ring seated in the ring receiving groove and having an external face to fit the inclined shoulder of the vibrating cup, a secondary ring abutting the first mentioned rings and having an inclined side face, a tertiary ring having an inclined side face fitting against the inclined face of the secondary ring and having a groove in its opposite side face, and a spring pressed follower engaging the last named groove.

2. In a piston rod packing, the combination with a packing gland and a vibrating cup seated therein the bore of said vibrating cup terminating in an inclined shoulder, a split brass ring abutting and fitting against the inclined shoulder of the vibrating cup, and having internal annular lubricant receiving grooves and an external ring receiving groove, a split soft metal ring fitted within the ring receiving groove and breaking joint with the brass ring, a secondary split ring abutting the brass ring and said soft ring and breaking joint with both and having an inclined inner face, a tertiary split ring abutting the inclined face of the secondary ring and breaking joint with said secondary ring, said secondary and tertiary rings being arranged between the vibrating cup and piston and engaging both, said tertiary ring having a V-shaped groove in its inner edge and a spring pressed follower having a correspondingly shaped projection fitting in said groove.

In testimony whereof I affix my signature in presence of two witnesses.

ALBERT C. BRIGNONI.

Witnesses:
JAMES T. HOWLEY,
F. L. SMITH.